United States Patent
Gao et al.

(10) Patent No.: US 11,617,095 B2
(45) Date of Patent: Mar. 28, 2023

(54) METHODS, TERMINAL DEVICE, NETWORK DEVICES AND APPARATUSES FOR INTERFERENCE MEASUREMENT

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 396 days.

(21) Appl. No.: 16/622,158

(22) PCT Filed: Jun. 13, 2017

(86) PCT No.: PCT/CN2017/088097
§ 371 (c)(1),
(2) Date: Dec. 12, 2019

(87) PCT Pub. No.: WO2018/227391
PCT Pub. Date: Dec. 20, 2018

(65) Prior Publication Data
US 2021/0153043 A1    May 20, 2021

(51) Int. Cl.
H04W 4/00       (2018.01)
H04W 24/08      (2009.01)
H04L 5/00       (2006.01)

(52) U.S. Cl.
CPC .......... *H04W 24/08* (2013.01); *H04L 5/0048* (2013.01)

(58) Field of Classification Search
CPC .... H04W 24/08; H04W 24/00; H04L 5/0048; H04L 5/0091; H04L 5/051; H04L 5/0023

USPC ........................................................ 370/252
See application file for complete search history.

(56) References Cited

U.S. PATENT DOCUMENTS

| | | | |
|---|---|---|---|
| 2015/0003368 A1 | 1/2015 | Park et al. | |
| 2015/0117338 A1 | 4/2015 | Janis et al. | |
| 2015/0256307 A1* | 9/2015 | Nagata | H04W 24/00 370/328 |
| 2016/0112177 A1* | 4/2016 | Zheng | H04W 52/243 370/330 |
| 2018/0323923 A1* | 11/2018 | Wang | H04J 11/0073 |
| 2019/0297519 A1* | 9/2019 | Han | H04L 5/0032 |

FOREIGN PATENT DOCUMENTS

| | | | | |
|---|---|---|---|---|
| CN | 102300244 A | 12/2011 | | |
| CN | 103037397 A | 4/2013 | | |
| EP | 3836434 A1 * | 6/2021 | | H04B 17/24 |
| WO | WO-2014058170 A1 * | 4/2014 | | H04B 17/345 |
| WO | WO-2016114868 A1 * | 7/2016 | | H04B 7/0626 |
| WO | WO-2017037505 A1 * | 3/2017 | | H04B 7/024 |

OTHER PUBLICATIONS

Samsung (R1-1706852, "Discussions on channel and interference measurements for NR", Spokane, USA Apr. 3-7, 2017) (Year: 2017).*

(Continued)

*Primary Examiner* — Maharishi V Khirodhar
(74) *Attorney, Agent, or Firm* — Sughrue Mion, PLLC

(57) ABSTRACT

A method of interference measurement includes performing interference measurement with interference measurement resource. The interference measurement resource may be a subset of resources for reference signal (RS). Measurements for the RS in the NR system are improved.

7 Claims, 6 Drawing Sheets

(56) References Cited

OTHER PUBLICATIONS

Huawei (R1-1704226, CSI acquisition framework, Spokane, USA Apr. 3-7, 2017 (Year: 2017).*
LG (R1-1704881, Discussion on interference measurement for NR, Spokane, USA Apr. 3-7, 2017) (Year: 2017).*
International Search Report for PCT/CN2017/088097 dated Feb. 24, 2018 [PCT/ISA/210].

* cited by examiner

METHODS, TERMINAL DEVICE, NETWORK DEVICES AND APPARATUSES FOR INTERFERENCE MEASUREMENT

CROSS REFERENCE TO RELATED APPLICATIONS

This is a National Stage of International Application No. PCT/CN2017/088097 filed Jun. 13, 2017.

FIELD OF THE INVENTION

The non-limiting and exemplary embodiments of the present disclosure generally relate to the field of wireless communication techniques, and more particularly relate to a method, terminal device and apparatus for interference measurement and a method, network device, apparatus for interference measurement configuration transmission.

BACKGROUND OF THE INVENTION

New radio access system, which is also called as NR system or NR network, is the next generation communication system. In Radio Access Network (RAN) #71 meeting for the third generation Partnership Project (3GPP) working group, study of the NR system was approved. The NR system will consider frequency ranging up to 100 Ghz with an object of a single technical framework addressing all usage scenarios, requirements and deployment scenarios defined in Technical Report TR 38.913, which includes requirements such as enhanced mobile broadband, massive machine-type communications, and ultra-reliable and low latency communications.

Discussion of multi-antenna scheme for new radio access started from May in 2016, including following aspects:
Multi-antenna scheme
Beam management
channel state information (CSI) acquisition
Reference signal and Quasi-Colocation (QCL)

In the NR system, the channel state information-reference signal (CSI-RS) was also designed for several functionalities, including for example, beam management, CSI acquisition, and potentially including fine time/frequency tracking, mobility, etc. In RAN #88 meeting, interference measurement based on ZP CSI-RS was agreed, and particularly, it was agreed that NR supports ZP CSI-RS based interference measurement for CSI feedback and the NR supports aperiodic, semi-persistent (as a working assumption) and periodic IMR based on ZP CSI-RS for interference measurement for CSI feedback. In addition, in RAN1 #89 meeting, interference measurement based on NZP CSI-RS was further agreed as a working assumption, and DMRS based interference measurement is to be further studied.

Thus, there is no a suitable solution about how to perform interference measurement on the RS resource in the NR system and thus there is a need for a solution for interference measurement in the art.

SUMMARY OF THE INVENTION

To this end, in the present disclosure, there is provided a new solution of interference measurement to mitigate or at least alleviate at least part of the issues in the prior art.

According to a first aspect of the present disclosure, there is provided a method of interference measurement at a terminal device. The method may comprise performing interference measurement with interference measurement resource, wherein the interference measurement resource is a subset of resources for reference signal.

According to a second aspect of the present disclosure, there is provided a method of transmitting interference measurement configuration. The method may comprise transmitting a configuration indication for the interference measurement resource, wherein the interference measurement resource is a subset of resources for reference signals.

According to a third aspect of the present disclosure, there is provided a terminal device. The terminal device may comprise: a transceiver configured to transmit and/or receive signals; and a controller configured to perform interference measurement with interference measurement resource, wherein the interference measurement resource is a subset of resources for reference signal.

According to a fourth aspect of the present disclosure, there is provided a network device. The network device may comprise a transceiver configured to transmit a configuration indication for the interference measurement resource, wherein the interference measurement resource is a subset of resources for reference signals.

According to a fifth aspect of the present disclosure, there is provided a computer-readable storage media with computer program code embodied thereon, the computer program code configured to, when executed, cause an apparatus to perform actions in the method according to any embodiment in the first aspect.

According to a sixth aspect of the present disclosure, there is provided a computer-readable storage media with computer program code embodied thereon, the computer program code configured to, when executed, cause an apparatus to perform actions in the method according to any embodiment in the second aspect.

According to a seventh aspect of the present disclosure, there is provided a computer program product comprising a computer-readable storage media according to the fifth aspect.

According to an eighth aspect of the present disclosure, there is provided a computer program product comprising a computer-readable storage media according to the sixth aspect.

With embodiments of the present disclosure, it may provide a suitable solution of interference measurement for the RS in the NR system in an efficient way.

BRIEF DESCRIPTION OF THE DRAWINGS

The above and other features of the present disclosure will become more apparent through detailed explanation on the embodiments as illustrated in the embodiments with reference to the accompanying drawings, throughout which like reference numbers represent same or similar components and wherein.

DETAILED DESCRIPTION OF EMBODIMENTS

Figure 1:
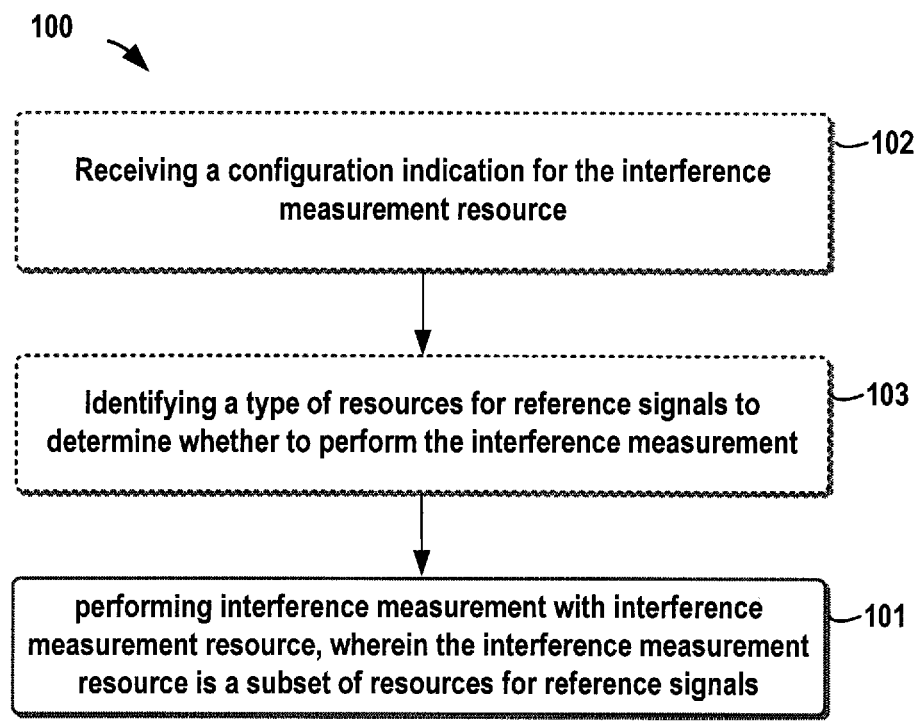
FIG. 1 schematically illustrates a flow chart of a method of interference measurement at a terminal device according to an embodiment of the present disclosure.

Hereinafter, the solution as provided in the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner.

In the accompanying drawings, various embodiments of the present disclosure are illustrated in block diagrams, flow charts and other diagrams. Each block in the flowcharts or blocks may represent a module, a program, or a part of code, which contains one or more executable instructions for performing specified logic functions, and in the present disclosure, a dispensable block is illustrated in a dotted line. Besides, although these blocks are illustrated in particular sequences for performing the steps of the methods, as a matter of fact, they may not necessarily be performed strictly according to the illustrated sequence. For example, they might be performed in reverse sequence or simultaneously, which is dependent on natures of respective operations. It should also be noted that block diagrams and/or each block in the flowcharts and a combination of thereof may be implemented by a dedicated hardware-based system for performing specified functions/operations or by a combination of dedicated hardware and computer instructions.

Generally, all terms used in the claims are to be interpreted according to their ordinary meaning in the technical field, unless explicitly defined otherwise herein. All references to "a/an/the/said [element, device, component, means, step, etc.]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

Additionally, in a context of the present disclosure, a user equipment (UE) may refer to a terminal, a Mobile Terminal (MT), a subscriber station, a portable subscriber station, Mobile Station (MS), or an Access Terminal (AT), and some or all of the functions of the UE, the terminal, the MT, the SS, the portable subscriber station, the MS, or the AT may be included. Furthermore, in the context of the present disclosure, the term "BS" may represent, e.g., a node B (NodeB or NB), an evolved NodeB (eNodeB or eNB), gNB (Node B in NR system), a radio header (RH), a remote radio head (RRH), a relay, or a low power node such as a femto, a pico, and so on.

As already mentioned, in the NR system, there is no a suitable solution about how to perform interference measurement on the RS. In order to address the above problem, in the present disclosure, it is proposed a solution of performing interference measurement on the RS. For illustrative purposes, reference will be made to FIGS. 1 to 9 to describe the solution of performing interference measurement on the RS according to embodiments of the present disclosure. It shall be appreciated that all embodiments are given for illustrative purposes and the present disclosure is not limited thereto.

FIG. 1 schematically illustrates a flow chart of a method 100 of interference measurement at a terminal device according to an embodiment of the present disclosure. The method 100 can be performed at a terminal device, for example UE, or other like terminal devices.

As illustrated in FIG. 1, first in step 101, the terminal device may perform interference measurement with interference measurement resource, wherein the interference measurement resource is a subset of resources for reference signal.

In the NR system, the CSI-RS was designed for several functionalities, including, for example, beam management, CSI acquisition, and possible including fine time/frequency tracking, mobility. The interference measurement is mainly used for the accurate channel quality acquired for data scheduling, so the CSI-RS for CSI acquisition is more suitable for interference measurement. The CSI-RS for other functionalities and/or configurations are not suitable or not needed for interference measurement, or at least the interference measured on different resources with different RS configurations may be different.

For example, the CSI-RS for beam management may only relate to one port for one beam, and thus there is no need for interference measurement, or even if for interference measurement, the interference measurement results should be used for different cases (for example, for measuring reference signal receive power (RSRP), as a reference value for interference from other beams) from the interference measurement with CSI-RS for CSI acquisition. As another example, the CSI-RS for mobility is mainly for the purpose of CSI-RS RSRP, and there is no need for interference measurement. As a further example, the CSI-RS for fine time/frequency tracking maybe only involve one port with high density, and thus there is no need for interference measurement, either. As a still further example, for the DMRS based interference measurement, it is mainly used for the feedback of multi-user scheduling, e.g. for MU-CQI. Thus, the interference measurement may be for different types, for example, for measuring RSRP, as a reference value for interference from other beams.

Thus, in the present disclosure, the interference measurement resource may be only a subset of resources for reference signal. The RS can comprise for example channel state information-reference signal (CSI-RS), demodulation reference signal (DMRS), sounding reference signal (SRS) and etc. In an embodiment of the present disclosure, resources for interference measurement can be restricted to a subset of the resources of RS. In an embodiment of the present disclosure, the interference measurement can be configured with only a subset of RS configurations. In another embodiment of the present disclosure, it may introduce configuration of types for interference measurement for different resources. For example, it may use an indication for interference for different cases or different processes, e.g. for MU-CQI or for SINR calculation. In a further embodiment of the present disclosure, it may use configuration rules for ZP CSI-RS and NZP CSI-RS based interference measurement.

In an embodiment of the present disclosure, it may configure the interference measurement with only a subset of the RS configurations. For example, RS and/or resources of RS for some functionalities and/or configurations are not configured for interference measurement. In an embodiment of the present disclosure, configurations for RS may include at least one of number of RS ports, density, RE pattern, number of symbols, CDM configuration, sequence index, and etc. The RS can include at least one of CSI-RS, DMRS, PTRS, TRS, MRS, SRS.

In an embodiment of the present disclosure, the subset of the RS configurations can be notified by the network and the terminal device may receive a configuration indication for the interference measurement resource in optional step 102.

In an embodiment of the present disclosure, the terminal device can use similar rule to determine whether to perform the interference measurement and the terminal device may identify a type of resources for reference signal in optional step 103 to determine whether to perform the interference measurement.

In an embodiment of the present disclosure, the interference measurement resource can be determined based on at least one of types, usages, properties of resources for reference signals.

It shall be also noted that interference measurement may be configured with IMR (interference measurement resource), wherein the IMR is subset of time/frequency resources for RS. In other words, the resources for IMR are less than the total resources for RS. Hereinbelow, examples interference measurement configurations will be described in details with reference to FIGS. 2A to 5B.

Figure 2A:
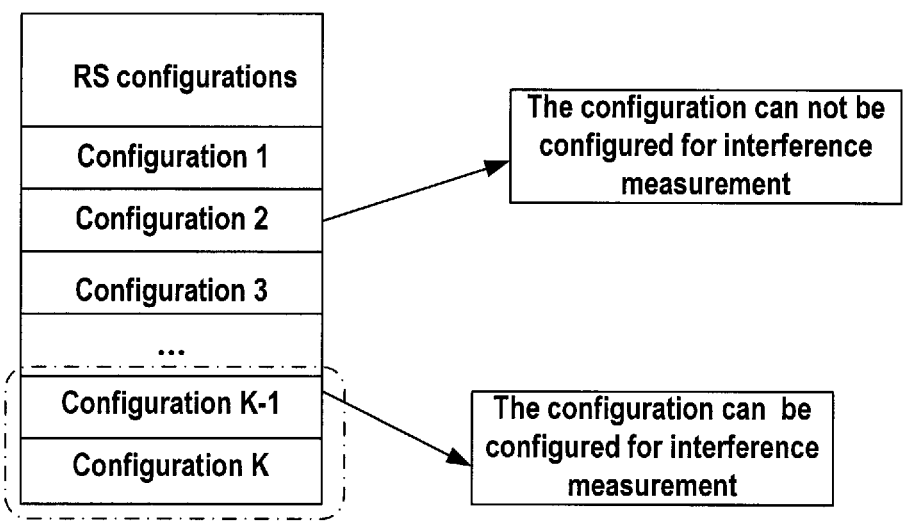
FIGS. 2A and 2B illustrate example interference measurement configurations according to embodiments of the present disclosure.
Figure 2B:
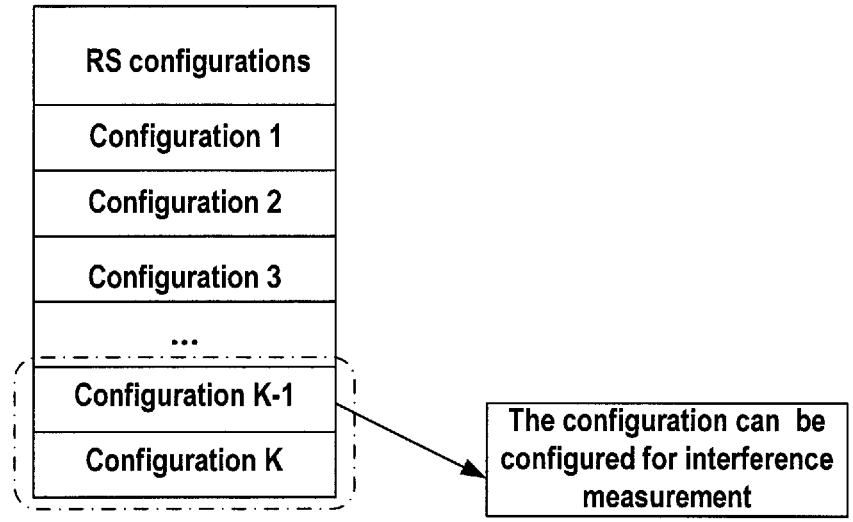

FIGS. 2A and 2B illustrate example interference measurement configurations according to embodiments of the present disclosure. As illustrated in FIG. 2A, it may define some RS configurations, for example Configurations 1, 2, 3 as those configurations that cannot be configured for interference measurement and some RS configurations, for example Configurations L . . . K−1, K, as those configurations that can be configured for interference measurement. Or alternatively, it may only define RS configurations, for example Configurations L . . . K−1, K, as configurations that can be configured for interference measurement, as illustrated in FIG. 2B.

In an embodiment of the present disclosure, there can be different types of interference measurement. For the set of RS configurations, different subsets of the configurations can be configured for different types of interference measurement. In an embodiment of the present disclosure, RS and/or the resources of RS for some functionalities and/or configurations cannot be configured for interference measurement type 1, and some other functionalities and/or configurations can be configured for interference measurement type 2. For example, for CSI-RS for CSI acquisition, if the resource or CSI-RS is configured for interference measurement, the UE may calculate the SINR and/or CQI based on the interference, and feedback, for example, the CSI for data scheduling. As another example, for CSI-RS for mobility and/or beam management, if the resource or CSI-RS is configured for interference measurement, the UE may regard the interference measurement results as interference from other Transmission Reference Points (TRPs) and/or beams, and it may report the interference to the network. As another example, for CSI-RS for mobility and/or beam management, the resource or CSI-RS may not be configured for interference measurement.

In an embodiment of the present disclosure, different interference measurement types can be performed on different IMR configurations. For example, interference measurement results on NZP CSI-RS and ZP CSI-RS can be different.

Figure 3A:
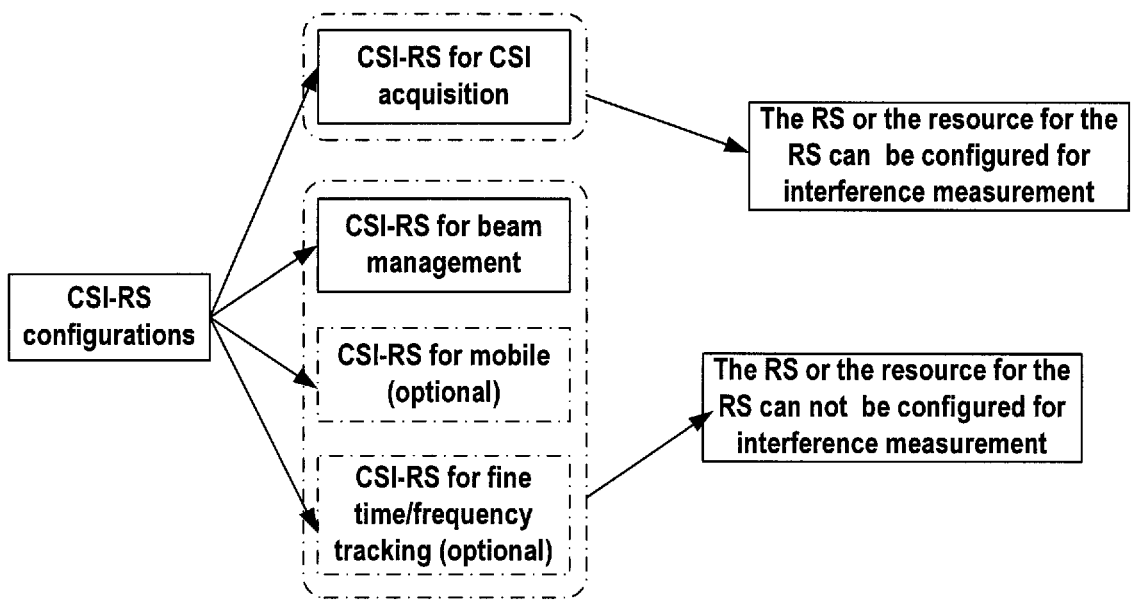
FIGS. 3A and 3B illustrate example interference measurement configurations according to embodiments of the present disclosure.
Figure 3B:
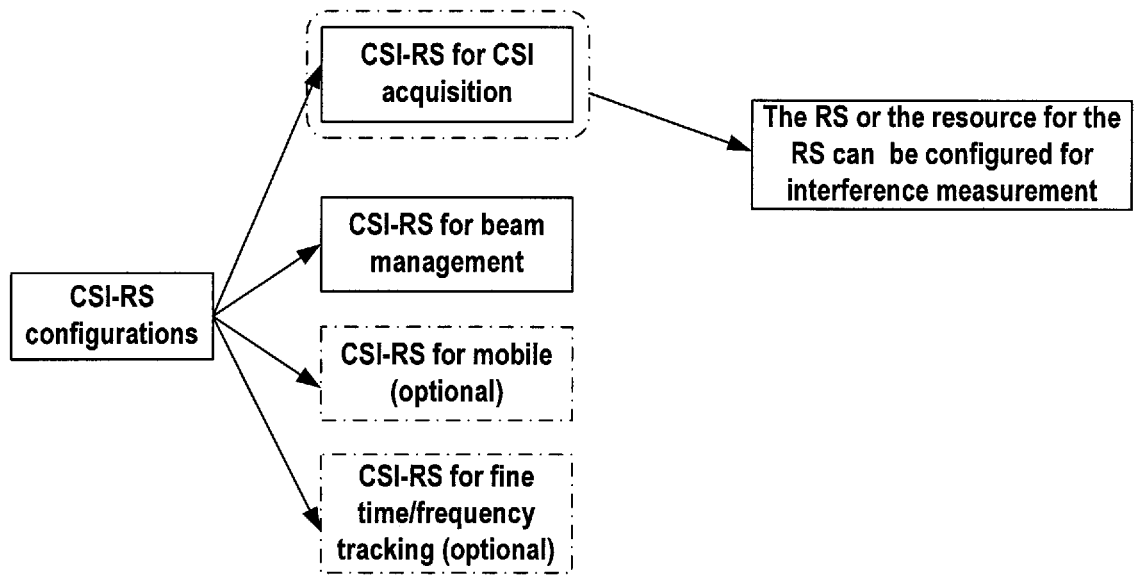

Taking the CSI-RS for example, for the set of CSI-RS configurations, only subset of the configurations can be configured for interference measurement. For example, as illustrated in FIG. 3A, it may define some CSI-RS configuration (for example CSI-RS for CSI acquisition) as those that can be configured for interference measurement and define some CSI-RS configuration (for example CSI-RS for beam management, CSI-RS for mobility (optional), CSI-RS for fine time/frequency tracking (optional)) as those that cannot be configured for interference measurement. Or alternatively, it may also only define some CSI-RS configuration (for example CSI-RS for CSI acquisition) as those that can be configured for interference measurement as illustrated in FIG. 3B.

For the RS configurations, some configurations of number of CSI-RS ports can be configured for the measurement, and some other cannot. For example, if X=1 port can only be configured for beam management, and/or mobility, and/or fine time/frequency tracking, but cannot be configured for CSI acquisition, then CSI-RS with X=1 port configuration may not be configured for interference measurement.

Figure 4A:
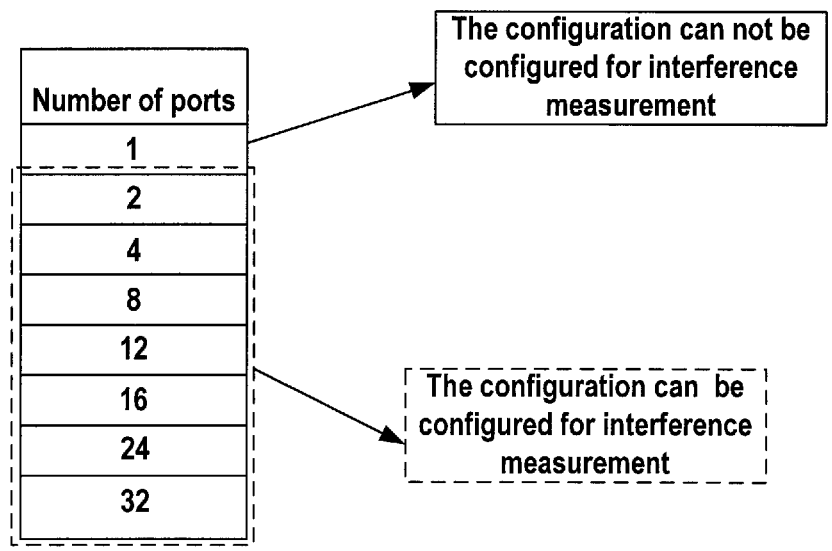
FIGS. 4A and 4B illustrate example interference measurement port configurations according to embodiments of the present disclosure.
Figure 4B:
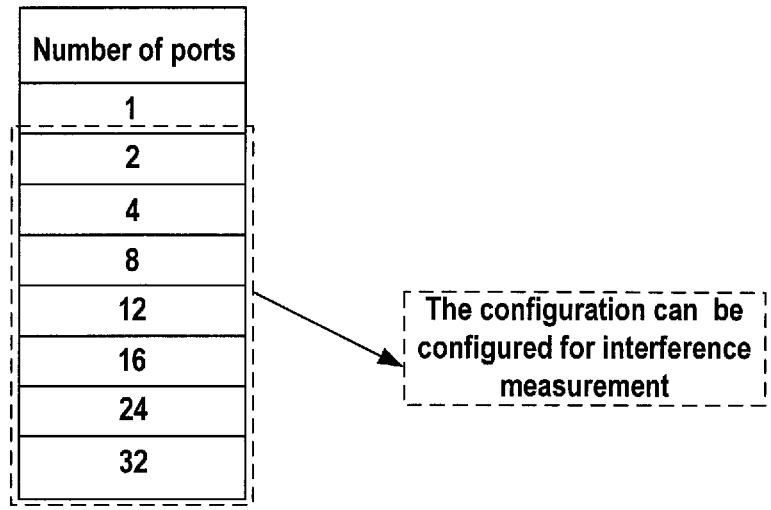

FIGS. 4A and 4B illustrate example RS port number configurations according to embodiments of the present disclosure. As illustrated in FIG. 4A, it may define port 1 as configuration that cannot be configured for interference measurement and define other ports, such as ports 2, 4, 6, 12, 16, 24 and 32 as configurations that can be configured for interference measurement. Or alternatively, it may only define ports, such as ports 2, 4, 6, 12, 16, 24 and 32 as configurations that can be configured for interference measurement, as illustrated in FIG. 4B.

In an embodiment of the present disclosure, for the RS configuration, it may be configured with different density configurations for different functionalities. The interference measurement may be configured according to different density configurations. For example, for the RS with specified configurations of density, the RS cannot be configured for interference measurement while the RS with other configurations of density, the RS can be configured for interference measurement. For example, if CSI-RS with density d>1 can only be configured for beam management, and/or mobility, and/or fine time/frequency tracking. Thus, the CSI-RS with d>1 configuration may not be configured for interference measurement. Thus, when the CSI-RS is configured with d>1, it will not be used for interference measurement.

Figure 5A:
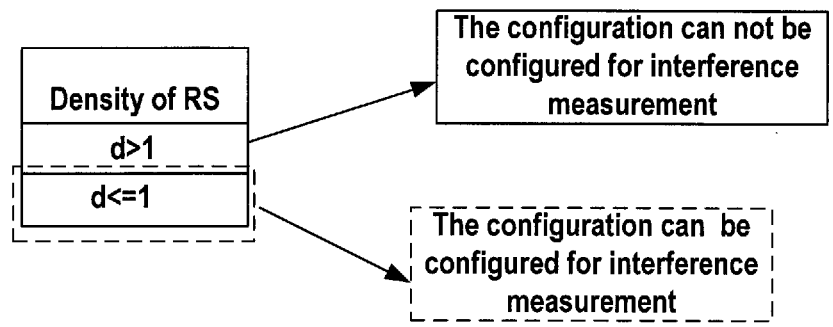
FIGS. 5A and 5B illustrate example interference measurement density configurations according to embodiments of the present disclosure.
Figure 5B:
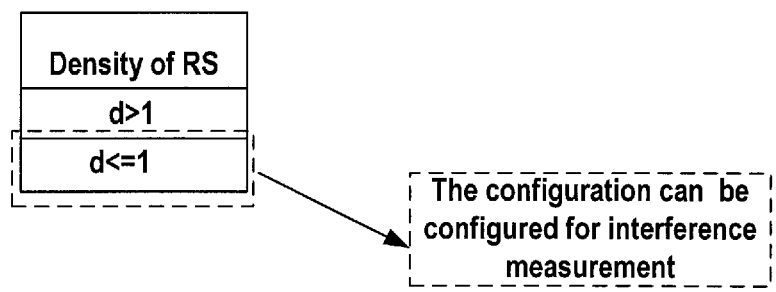

FIGS. 5A and 5B illustrate example interference measurement density configurations according to embodiments of the present disclosure. As illustrated in FIG. 5A, it may define density configuration with density d>1 as configurations that cannot be configured for interference measurement and define density configuration with density d<=1 as configurations that can be configured for interference measurement. Or alternatively, it may only define density configurations with density d<=1 as configurations that can be configured for interference measurement, as illustrated in FIG. 5B.

In an embodiment of the present disclosure, for configurations of different values of subcarrier spacing (SCS), some configurations can be configured for interference measurement, and some other configurations cannot. For example, if a larger SCS is used for CSI-RS for beam management, configurations corresponding to the larger SCS may not be used for interference measurement; or if used, different interference measurement types may be applied. As another example, for CSI acquisition, the SCS for CSI-RS is implicitly indicated (e.g. same with data), and for beam management with the larger SCS, there may be additional field for SCS configuration. If there is a field for SCS, the CSI-RS may not be used for interference measurement, or alternatively may be used for different interference measurement types. As another embodiment, if a larger SCS than downlink and/or uplink transmission, and/or reference SCS within the configured frequency band is configured for CSI-RS, the CSI-RS may not be used for interference measurement.

In an embodiment of the present disclosure, for configurations of comb, some configurations can be configured for interference measurement, and some other configurations cannot. For example, if Interleaved FDMA (IFDMA) based structure CSI-RS used for beam management, these configurations may not be used for interference measurement, or if used, the interference measurement types are different with that of CSI-RS for CSI acquisition. As another example, if the field of comb and/or offset is configured for the CSI-RS in the configuration, the CSI-RS and/or the resource for the CSI-RS may not be used for interference measurement, or alternatively, it may be used for interference measurement with different types.

In an embodiment of the present disclosure, a ZP CSI-RS can be used to perform interference measurement, while if the ZP CSI-RS is overlapped with another reference signal resource, like NZP CSI-RS resource, in these overlapped resources, it is possible to make some restriction to the interference measurement.

In an embodiment of the present disclosure, interference measurement is configured with IMR (interference measurement resource) and the IMR is for ZP CSI-RS based interference measurement by default. Thus, if IMR is not overlapped with NZP CSI-RS configuration for the UE, the UE may measure the interference on the IMR as ZP CSI-RS based interference measurement. If there are some resources overlapped with NZP CSI-RS configurations for the UE, the interference measurement is restriction.

The overlapped resources with different NZP CSI-RS configurations can be measured with same or different measurement types. For example, the NZP CSI-RS configurations may be for CSI acquisition, the NZP CSI-RS configurations for beam management, and/or mobility, and/or fine time/frequency tracking. In such a case, it may adopt for example the following two type strategies.

Type I: UE measures the interference on the overlapped resources with NZP CSI-RS based interference measurement. For example, the resources overlapped with NZP CSI-RS can be for CSI acquisition.

Type II: UE does not measure the interference on the overlapped resources. For example, the resources overlapped with NZP CSI-RS can be for beam management, and/or mobility, and/or fine time/frequency tracking.

In addition, it may also use another alternative Type II as follows:

Type II: UE may measure the interference on the overlapped resources with different ways. For example, the resources overlapped with NZP CSI-RS can be for beam management, interference measured on these resources can be inter-beam or inter-TRP interference, but not used for CQI or SINR calculation.

In an embodiment of the present disclosure, it may perform a zero power channel state information-reference signal (ZP CSI-RS) based interference measurement in response to no detection of a resource overlapping between the interference measurement resource and another reference signal resource. On the other hand, if the resource overlapping is detected and an interference measurement indication for resource portion related to the resource overlapping is received from the network, it may perform the NZP CSI-RS based interference measurement resource In an example of the present disclosure, the ZP CSI-RS based interference measurement is configured with ZP CSI-RS resources and the NZP CSI-RS based interference measurement is configured with interference measurement indication in CSI-RS configurations, or NZP CSI-RS interference resources. The interference measurement indication can be configured for some of the CSI-RS configurations (e.g. only for the CSI-RS for CSI acquisition). If there are no overlapped resources among the ZP CSI-RS configuration and the NZP CSI-RS configurations for the UE, the UE measures the interference on the resources with ZP CSI-RS based interference measurement. If there are overlapped resources among the ZP CSI-RS configuration and the NZP CSI-RS configurations for the UE and no interference measurement indication is received from the network, the interference measurement will not be performed on the overlapped resource. If there are overlapped resources among the ZP CSI-RS configuration and the NZP CSI-RS configurations for the UE and interference measurement indication is received from the network, the UE may measure the interference on the overlapped resources with NZP CSI-RS based interference measurement.

Figure 6:
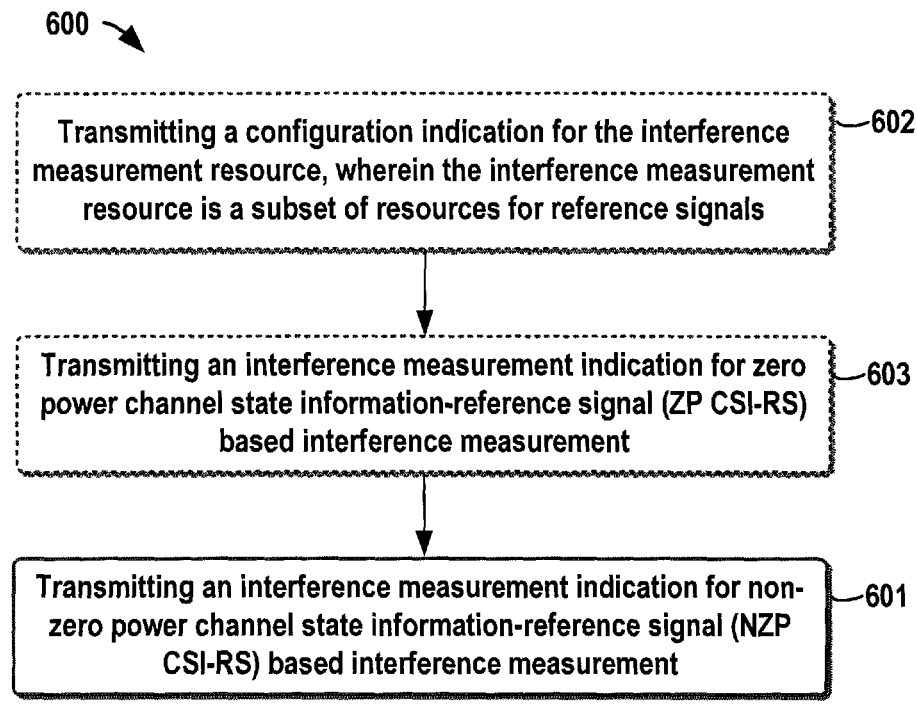
FIG. 6 schematically illustrates a flow chart of a method of interference measurement configuration transmission at a network device according to an embodiment of the present disclosure.

FIG. 6 illustrates a flow chart of method of transmitting interference measurement information according to an embodiment of the present disclosure. As illustrated in FIG. 6 in step 601, the network device in the NR system, like gNB, transmits a configuration indication for the interference measurement resource to the terminal device. The configuration indication will indicate that the interference measurement resource to be used for the interference measurement, which is a subset of resources for reference signals. In an embodiment of the present disclosure, the reference signal may comprise one or more of channel state information-reference signal; demodulation reference signal; and sounding reference signal.

Optionally, in step 602, the network device like gNB may transmit an interference measurement indication for zero power channel state information-reference signal (ZP CSI-RS) based interference measurement to indicate perform the ZP CSI-RS based interference measurement.

Further optionally, in step 603, the network device like gNB may also transmit an interference measurement indication for non-zero power channel state information-reference signal (NZP CSI-RS) based interference measurement to indicate that the NZP-CSI-RS based interference measurement can be performed if the RS source is used for CSI acquisition.

Figure 7:
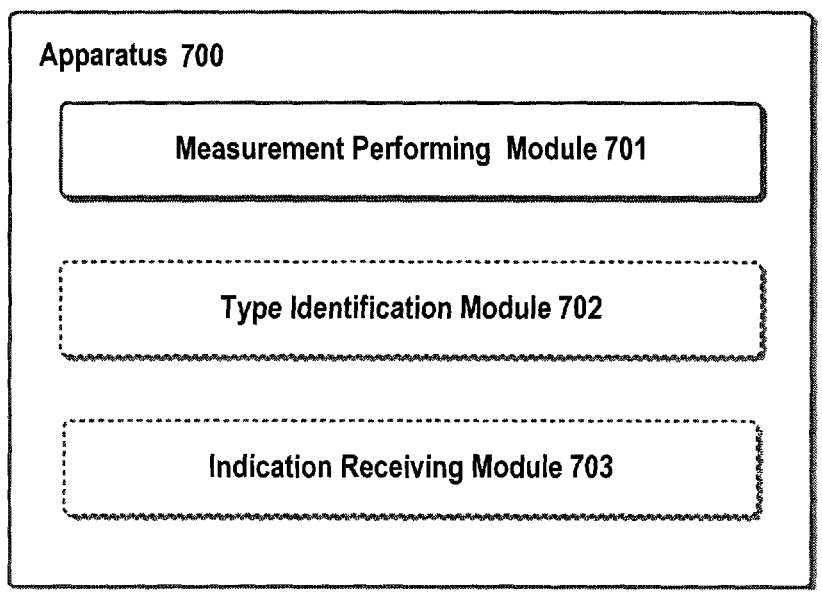
FIG. 7 schematically illustrates a block diagram of an apparatus for interference measurement at a terminal device according to an embodiment of the present disclosure.

FIG. 7 illustrates an apparatus for interference measurement at a terminal device according to an embodiment of the present disclosure. Apparatus 700 can be implemented at a terminal device such as UE.

As illustrated in FIG. 7, apparatus 700 comprises a measurement performing module 701. The measurement performing module 701 can be configured to perform interference measurement with interference measurement resource, wherein the interference measurement resource is a subset of resources for reference signal.

In an embodiment of the present disclosure, the reference signal comprises one or more of channel state information-reference signal; a demodulation reference signal; and a sounding reference signal.

In another embodiment of the present disclosure, apparatus 700 may further comprise a type identification module 702 configured to identify a type of resources for reference signal to determine whether to perform the interference measurement.

In a further embodiment of the present disclosure, apparatus 700 may further comprise: an indication receiving module 703 configured to receive a configuration indication for the interference measurement resource.

In a still further embodiment of the present disclosure, the interference measurement resource can be determined based on at least one of types, usages, properties of resources for reference signals.

In a yet further embodiment of the present disclosure, the measurement performing module 701 may be further configured to perform a zero power channel state information-reference signal (ZP CSI-RS) based interference measurement in response to no detection of a resource overlapping between the interference measure resource and another reference signal resource; or restrict the interference measurement in response to detection of the resource overlapping.

In a yet still further embodiment of the present disclosure, the measurement performing module 701 is further configured to perform a zero power channel state information-reference signal (ZP CSI-RS) based interference measurement in response to no detection of a resource overlapping between the interference measurement resource and another reference signal resource; or perform the NZP CSI-RS based interference measurement resource in response to detection of the resource overlapping and an interference measurement indication for resource portion related to the resource overlapping.

Figure 8:
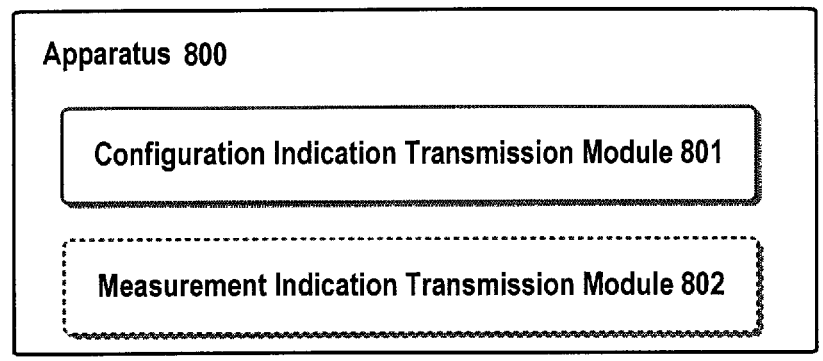
FIG. 8 schematically illustrates a block diagram of an apparatus for interference measurement configuration transmission at a network device according to an embodiment of the present disclosure.

FIG. 8 illustrates a block diagram of an apparatus of transmitting interference measurement information according to an embodiment of the present disclosure. As illustrated in FIG. 8, apparatus 800 comprises a configuration indication transmission module 801. The configuration indication transmission module 801 can be configured to transmit a configuration indication for the interference measurement resource, wherein the interference measurement resource is a subset of resources for reference signals.

In an embodiment of the present disclosure, the apparatus 800 further comprises a measurement configuration indication transmission module 802, which can be further configured to at least one of transmitting an interference measurement indication for zero power channel state information-reference signal (ZP CSI-RS) based interference measurement; and transmitting an interference measurement indication for non-zero power channel state information-reference signal (NZP CSI-RS) based interference measurement.

Hereinbefore, the apparatuses 700 and 800 are described with reference to FIGS. 7 and 8 in brief. It is noted that the apparatuses 700 and 800 may be configured to implement functionalities as described with reference to FIGS. 1 to 6. Therefore, for details about the operations of modules in these apparatuses, one may refer to those descriptions made with respect to the respective steps of the methods with reference to FIGS. 1 to 6.

It is further noted that components of the apparatuses 700 and 800 may be embodied in hardware, software, firmware, and/or any combination thereof. For example, the components of apparatuses 700 and 800 may be respectively implemented by a circuit, a processor or any other appropriate selection device.

Those skilled in the art will appreciate that the aforesaid examples are only for illustration not limitation and the present disclosure is not limited thereto; one can readily conceive many variations, additions, deletions and modifications from the teaching provided herein and all these variations, additions, deletions and modifications fall the protection scope of the present disclosure.

In addition, in some embodiment of the present disclosure, apparatuses 700 and 800 may comprise at least one processor. The at least one processor suitable for use with embodiments of the present disclosure may include, by way of example, both general and special purpose processors already known or developed in the future. Apparatuses 700 and 800 may further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause apparatuses 700 and 800 to at least perform operations according to the method as discussed with reference to FIGS. 1 to 6 respectively.

Figure 9:
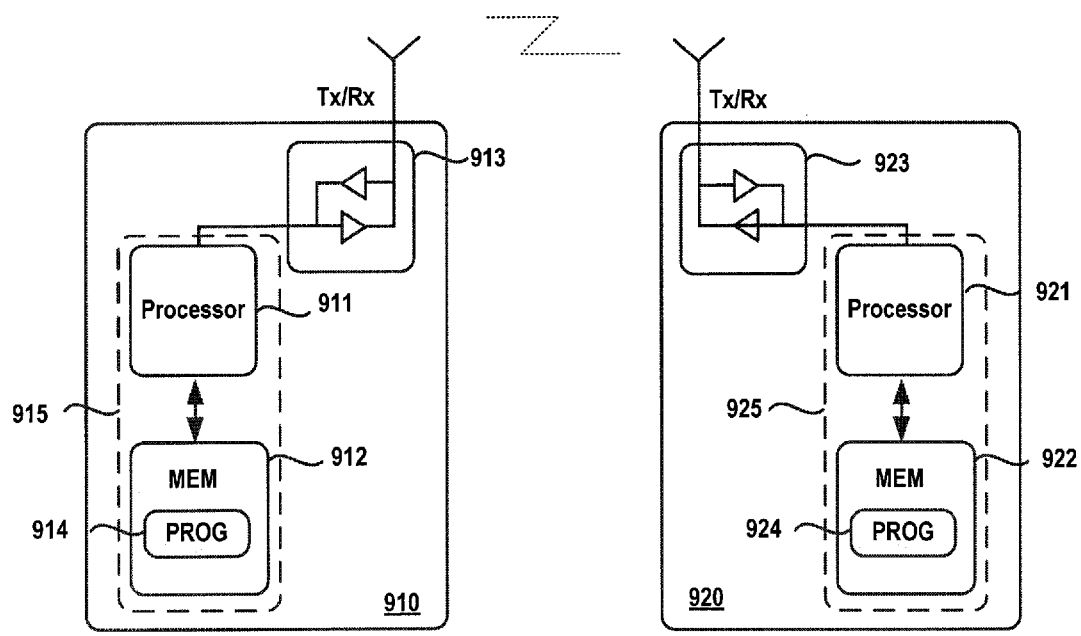
FIG. 9 further illustrates a simplified block diagram of an apparatus 910 that may be embodied as or comprised in a network device ((like gNB), and an apparatus 920 that may be embodied as or comprised in a terminal device like UE as described herein.

FIG. 9 further illustrates a simplified block diagram of an apparatus 99 that may be embodied as or comprised in a network device like a base station in a wireless network and an apparatus 920 that may be embodied as or comprised in a terminal device like UE as described herein.

The apparatus 910 comprises at least one processor 911, such as a data processor (DP) and at least one memory (MEM) 912 coupled to the processor 911. The apparatus 910 may further comprise a transmitter TX and receiver RX 913 coupled to the processor 911, which may be operable to communicatively connect to the apparatus 920. The MEM 912 stores a program (PROG) 914. The PROG 914 may include instructions that, when executed on the associated processor 911, enable the apparatus 910 to operate in accordance with embodiments of the present disclosure, for example the method 600. A combination of the at least one processor 911 and the at least one MEM 912 may form processing means 915 adapted to implement various embodiments of the present disclosure.

The apparatus 920 comprises at least one processor 921, such as a DP, and at least one MEM 922 coupled to the processor 921. The apparatus 920 may further comprise a suitable TX/RX 923 coupled to the processor 921, which may be operable for wireless communication with the apparatus 910. The MEM 922 stores a PROG 924. The PROG 924 may include instructions that, when executed on the associated processor 921, enable the apparatus 920 to operate in accordance with the embodiments of the present disclosure, for example to perform the method 100. A combination of the at least one processor 921 and the at least one MEM 922 may form processing means 925 adapted to implement various embodiments of the present disclosure.

Various embodiments of the present disclosure may be implemented by computer program executable by one or more of the processors 911, 921, software, firmware, hardware or in a combination thereof.

The MEMs 912 and 922 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 911 and 921 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with one embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method of interference measurement, comprising:
   receiving configuration information of a plurality of Channel state information-Reference signal (CSI-RS) resources, wherein the plurality of CSI-RS resources comprises a first CSI-RS resource for interference measurement and a second CSI-RS resource for tracking;
   performing interference measurement with the first CSI-RS resource, wherein the first CSI-RS resource corresponds to a subset of a plurality of reference signals; and
   transmitting a CSI feedback based on the first CSI-RS resource for interference measurement and not based on the second CSI-RS resource for tracking.

2. The method of claim 1, wherein the plurality of reference signals comprises one or more of:
   a channel state information-reference signal;
   a demodulation reference signal; and
   a sounding reference signal.

3. The method of claim 1, wherein
   the configuration information indicates a density and a number of symbols associated with the first CSI-RS resource,
   the density is less than or equal to 1, and
   the performing the interference measurement comprises measuring the first CSI-RS resource.

4. A method performed by a network device of transmitting interference measurement configuration information, the method comprising:
   transmitting configuration information of a plurality of Channel state information-Reference signal (CSI-RS) resources, wherein the plurality of CSI-RS resources comprises a first CSI-RS resource for interference measurement and a second CSI-RS resource for tracking, and
   receiving a CSI feedback based on the first CSI-RS resource for interference measurement, wherein the CSI feedback is not based on the first CSI-RS resource for tracking.

5. The method of claim 4, wherein
   the configuration information indicates a zero power channel state information-reference signal (ZP CSI-RS) based interference measurement; or
   the configuration information indicates a non-zero power channel state information-reference signal (NZP CSI-RS) based interference measurement.

6. The method of claim 4, wherein the configuration information indicates the second CSI-RS resource is configured for a measurement other than a CSI feedback for interference.

7. The method of claim 6, wherein
   the configuration information indicates a density and a number of symbols associated with the second CSI-RS resource,
   the density is greater than 1, the method further comprising performing a second measurement of the second CSI-RS resource, wherein the second measurement is associated with tracking.

\* \* \* \* \*